(12) United States Patent
Asai (10) Patent No.: US 11,754,900 B2
(45) Date of Patent: Sep. 12, 2023

(54) RECEIVER FOR FREE-SPACE OPTICAL COMMUNICATION

(71) Applicant: SUBARU CORPORATION, Tokyo (JP)

(72) Inventor: Takayuki Asai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 329 days.

(21) Appl. No.: 16/996,514

(22) Filed: Aug. 18, 2020

(65) Prior Publication Data

US 2021/0063782 A1 Mar. 4, 2021

(30) Foreign Application Priority Data

Aug. 26, 2019 (JP) .................................. 2019-153331

(51) Int. Cl.
*H04B 10/00* (2013.01)
*G02F 1/137* (2006.01)
(Continued)

(52) U.S. Cl.
CPC ......... *G02F 1/137* (2013.01); *G02B 26/0816* (2013.01); *G02B 27/144* (2013.01);
(Continued)

(58) Field of Classification Search
CPC ... H04B 10/11; H04B 10/112; H04B 10/1123; H04B 10/1125; H04B 10/1127;
(Continued)

(56) References Cited

U.S. PATENT DOCUMENTS 6,178,024 B1 * 1/2001 Degura .............. H04B 10/1125
398/119
6,263,127 B1 7/2001 Dragone et al.
(Continued)

FOREIGN PATENT DOCUMENTS

JP 5-3454 A 1/1993
JP 11-215062 A 8/1999
(Continued)

OTHER PUBLICATIONS

Notice of Reasons for Refusal issued in Japanese Patent Application No. 2019-153331 dated Jul. 11, 2023, with machine translation.

*Primary Examiner* — Hanh Phan
(74) *Attorney, Agent, or Firm* — TROUTMAN PEPPER HAMILTON SANDERS LLP (57) ABSTRACT

A receiver for free-space optical communication includes a beam splitter, an imaging unit, a specifying unit, a light-receiving unit, and a controller. The beam splitter splits incident light into first and second light beams travelling in different directions. The imaging unit captures an image of the first light beam. The specifying unit extracts a signal light beam from the image of the first light beam and specifies a position of the signal light beam in the image. The light-receiving device receives the second light beam. The controller controls a blocker on the basis of the position of the signal light beam to allow only a limited portion of the second light beam to enter the light-receiving device and prevent a remaining portion of the second light beam from entering the light-receiving device. The limited portion of the second light beam includes the signal light beam.

16 Claims, 4 Drawing Sheets

(51) Int. Cl.
*G02F 1/133* (2006.01)
*H04B 10/11* (2013.01)
*G02B 27/14* (2006.01)
*H04B 10/60* (2013.01)
*G02B 26/08* (2006.01)

(52) U.S. Cl.
CPC ......... *G02F 1/13306* (2013.01); *H04B 10/11* (2013.01); *H04B 10/60* (2013.01)

(58) Field of Classification Search
CPC . H04B 10/114; H04B 10/1149; H04B 10/118; H04B 10/116; H04B 10/40; H04B 10/2507; H04B 10/60
USPC ....... 398/118, 119, 120, 121, 122, 123, 124, 398/125, 126, 127, 128, 129, 130, 131, 398/135, 136, 172, 158, 159, 202, 208, 398/209, 212
See application file for complete search history.

(56) References Cited

U.S. PATENT DOCUMENTS

| | | | |
|---|---|---|---|
| 6,384,944 B1* | 5/2002 | Takayama | H04B 10/1125 398/131 |
| 2002/0080452 A1 | 6/2002 | Sakanaka | |
| 2012/0134682 A1* | 5/2012 | Capron | H04B 10/112 398/152 |
| 2016/0204866 A1* | 7/2016 | Boroson | H04B 10/61 398/97 |
| 2018/0159622 A1* | 6/2018 | Hsieh | H04B 10/116 |

FOREIGN PATENT DOCUMENTS

| | | |
|---|---|---|
| JP | 2000-347065 A | 12/2000 |
| JP | 2006-148192 A | 6/2006 |
| JP | 2011-8903 A | 1/2011 |

* cited by examiner

RECEIVER FOR FREE-SPACE OPTICAL COMMUNICATION

CROSS-REFERENCE TO RELATED APPLICATIONS

The present application claims priority from Japanese Patent Application No. 2019-153331 filed on Aug. 26, 2019, the entire contents of which are hereby incorporated by reference.

BACKGROUND

The disclosure relates to a receiver for free-space optical communication, particularly to a receiver for free-space optical communication mountable on an aircraft or the like.

A free-space optical communication technology using light, such as laser light, has been developed for communication between aircrafts and between aircrafts and ground stations. Through such development, receivers for free-space optical communication have also been developed. Reference is made to Japanese Unexamined Patent Application Publication (JP-A) Nos. H05-003454, 2006-148192, and H11-215062.

SUMMARY

An aspect of the technology provides a receiver for free-space optical communication that includes a beam splitter, an imaging unit, a specifying unit, a light-receiving unit, and a controller. The beam splitter is configured to split incident light into a first light beam and a second light beam. The first light beam and the second light beam travel in different directions. The imaging unit is configured to capture an image of the first light beam. The specifying unit is configured to extract a signal light beam from the image of the first light beam captured by the imaging unit and specify a position of the signal light beam in the image. The light-receiving device is configured to receive the second light beam. The controller is configured to control a blocker disposed between the beam splitter and the light-receiving device on the basis of the position of the signal light beam specified by the specifying unit to allow only a limited portion of the second light beam to enter the light-receiving device and prevent a remaining portion of the second light beam from entering the light-receiving device. The limited portion of the second light beam includes the signal light beam.

An aspect of the technology provides a receiver for free-space optical communication that includes a beam splitter, an imaging unit, a light-receiving unit, and circuitry. The beam splitter is configured to split incident light into a first light beam and a second light beam. The first light beam and the second light beam travel in different directions. The imaging unit is configured to capture an image of the first light beam. The light-receiving device is configured to receive the second light beam. The circuitry is configured to extract a signal light beam from the image of the first light beam captured by the imaging unit, specify a position of the signal light beam in the image, and control a blocker disposed between the beam splitter and the light-receiving device on the basis of the specified position of the signal light beam to allow only a limited portion of the second light beam to enter the light-receiving device and prevent a remaining portion of the second light beam from entering the light-receiving device. The limited portion of the second light beam includes the signal light beam.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 2 is a diagram illustrating an example image of a signal light beam or the like.

DETAILED DESCRIPTION

A receiver for free-space optical communication according to some example embodiments of the disclosure will now be described in detail with reference to the accompanying drawings. Note that, in the following description, a receiver for free-space optical communication may be mounted on an aircraft and receive a signal light beam emitted from a transmitter mounted on another aircraft, such as a helicopter. However, embodiments of the present technology may not be limited to the case in which the receiver for free-space optical communication is mounted on an aircraft or the case in which the transmitter is mounted on another aircraft. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description, upstream and downstream directions are defined along the traveling direction of a signal light beam of the receiver for free-space optical communication. The signal light beam may be visible light, infrared light, or the like. The wavelength of the signal light beam to be used may not be limited to a particular wavelength. The signal light beam may be emitted from a laser light source, a lighting device, or the like. The transmission source, the transmission method, and the like may also not be limited to a particular source, method, or the like.

Figure 1:
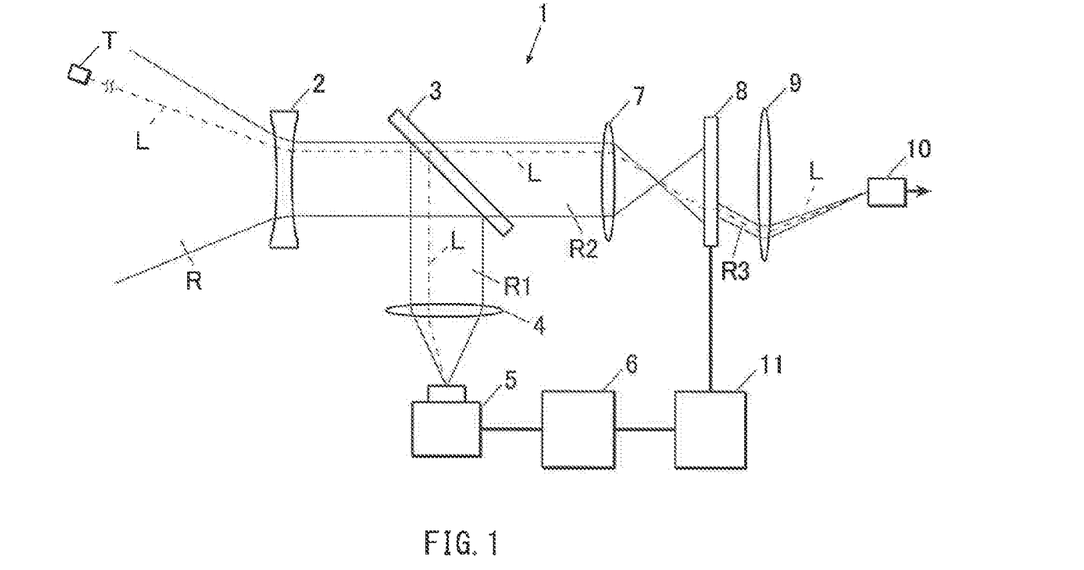
FIG. 1 is a diagram illustrating an example configuration of a receiver for free-space optical communication according to one example embodiment of the disclosure.

FIG. 1 is a diagram illustrating the configuration of a receiver for free-space optical communication according to an example embodiment of the disclosure. Note that the free-space optical receiver may be hereinafter simply referred to as a "receiver" as appropriate. In this example embodiment, a receiver 1 for free-space optical communication may include a lens system 2 at a position farthest upstream. The lens system 2 may refract incident light R to collimate the light R into parallel light. The lens system 2 may include a single lens as illustrated in FIG. 1, or may include convex and concave lenses in combination, for example. The light refracted by the lens system 2 may not necessarily be parallel light.

A beam splitter 3 may be disposed downstream of the lens system 2. As illustrated in FIG. 1, the incident light R may include a signal light beam L emitted from a transmission source T. The signal light beam L entering the lens system 2 from any direction may be refracted in a predetermined direction. For example, the signal light beam L may be refracted toward the right direction in FIG. 1. The refracted signal light beam L may enter the beam splitter 3. In one embodiment, the lens system 2 may serve as a "first lens system".

The beam splitter 3 splits the incident light R into a first light beam R1 and a second light beam R2. The first light beam R1 and the second light beam R2 travel in different directions. In one embodiment, the first light beam R1 may serve as a "first light beam". In one embodiment, the second light beam R2 may serve as a "second light beam". In this example embodiment, the beam splitter 3 may include a half mirror. The beam splitter 3 may be disposed at an angle of approximately 45 degrees to the traveling direction of the parallel light. The beam splitter 3 allows a portion of the incident light R including the signal light beam L to pass through and continues to travel straight. The beam splitter 3 reflects the remaining portion of the incident light R at an angle of approximately 90 degrees to the traveling direction of the parallel light.

The first light beam R1 from the beam splitter 3 may be refracted by a lens system 4 and enter an imaging unit 5. The imaging unit 5 captures an image of the first light beam R1. The imaging unit 5 may include a camera configured to capture a moving image having a frame rate of, for example, several tens or several hundreds of frames per second. Alternatively, the imaging unit 5 may include a camera that captures still images.

The imaging unit 5 may be coupled to a specifying unit 6 including a computer and the like. The specifying unit 6 extracts the signal light beam L from the image of the first light beam R1 captured by the imaging unit 5 and specifies the position of the signal light beam L in the image. Examples of a method of specifying the position of the signal light beam L in an image by the specifying unit 6 will now be described.

Figure 2:
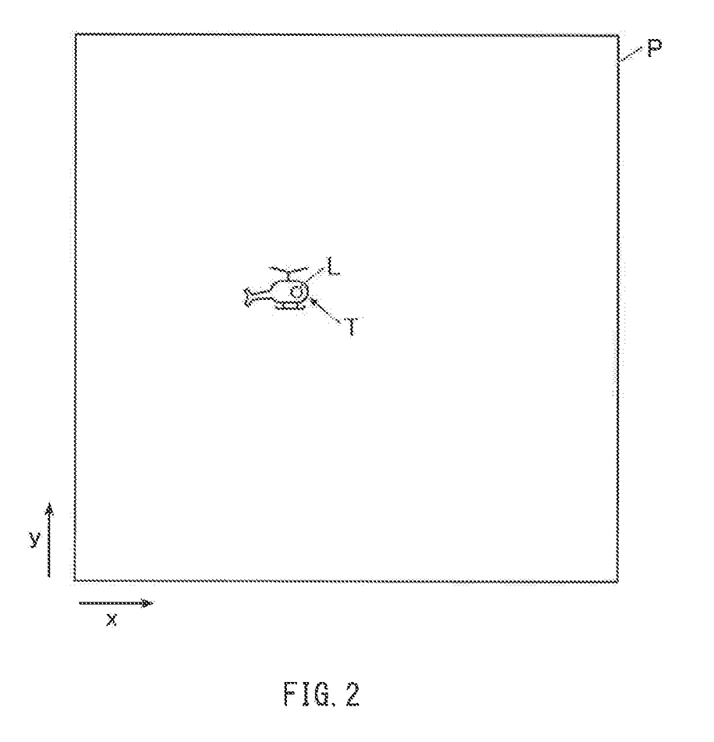

For example, a transmission source T may emit a signal light beam L having a specific color, as illustrated in FIG. 1. The specifying unit 6 may be configured to specify the position or pixel (x,y) of the specific color in an image P captured by the imaging unit 5 as the position of the signal light beam L in the image P, as illustrated in FIG. 2. In such a case, the specific color may be a rare color in nature, such as orange, to readily extract the signal light beam L from the image P of the incident light R or the first light beam R1.

Figure 3:
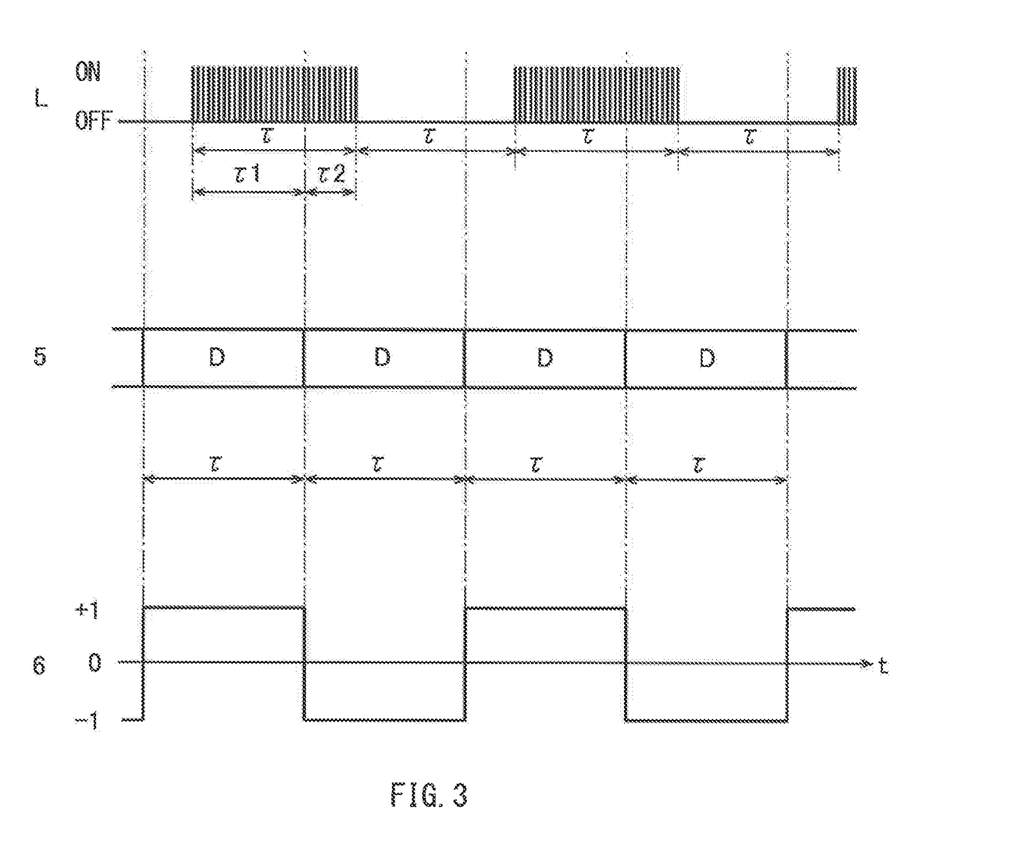
FIG. 3 is a diagram illustrating an example relation among an emission of a signal light beam, reading timings of pixel values by an imaging unit, and values to be multiplied with pixel values by a specifying unit.

Another configuration may be employed as illustrated in the top of FIG. 3, for example. The transmission source T may emit a blinking signal light beam L with alternately repeating an ON period and an OFF period. The signal light beam L may be emitted in the ON period, whereas the signal light beam L may not be emitted in the OFF period. The ON period and the OFF period may be repeated at time intervals T. Note that the ON period and the OFF period of the emission of the signal light beam L may have different lengths of time. As illustrated in the middle of FIG. 3, the imaging unit 5 may read the pixel value D of a pixel (x,y) in the image P during each time interval T and transmit the pixel value D to the specifying unit 6. Note that, the transmission source T and the imaging unit 5 may not be synchronized.

As illustrated in the bottom of FIG. 3, the specifying unit 6 may add the pixel value D of a pixel (x,y) received from the imaging unit 5 at one timing to the product of −1 and the pixel value D of a pixel (x,y) received from the imaging unit 5 at a subsequent timing, for each pixel (x,y). The subsequent timing may be time τ after the preceding timing. In a case where the pixel value D is the value of a pixel of the image of an object having a constant brightness or slowly variable brightness with time, such as the sky or clouds, the pixel value D of a pixel received from the imaging unit 5 at the preceding timing may be equal or substantially equal to the pixel value D of a pixel received from the imaging unit 5 at the subsequent timing. Therefore, the sum determined through the above-described calculation may be zero or substantially zero.

However, in a case where the pixel value D is the value of a pixel of the signal light beam L, the pixel value D of a pixel sent at a preceding timing may be a value corresponding to the signal light beam L transmitted during the time interval τ1, whereas the pixel value D of a pixel sent at a subsequent timing may be a value corresponding to the signal light beam L transmitted during a time interval τ2, as illustrated in the top of FIG. 3. Therefore, the sum of the former pixel value D and the latter pixel value D multiplied by −1 may be a positive or negative value that is significantly different from zero. In other words, the absolute value of the sum may be significantly larger than zero. Through the above-described calculation based on the pixel values D of pixels (x,y) in the images P captured by the imaging unit 5 at two consecutive timings, the specifying unit 6 may specify the position or pixel of the signal light beam L in the image P on the basis of the sum or the absolute value of the sum for each pixel (x,y).

Note that, in a case where the time intervals τ1 and τ2 are the same or substantially the same, the sum or the absolute value of the sum of the pixel values D of pixels corresponding to the signal light beam L in the images P may be substantially zero. This may make it difficult to specify the position or pixel of the signal light beam L in the image P. In such a case, the timing of imaging by the imaging unit 5 or the timing of reading the pixel value D of each pixel by the imaging unit 5 may be shifted forward or backward in time. In this way, the sum may be significantly different from zero, i.e., the absolute value of the sum may be larger than zero. This enables the specifying unit 6 to specify the position or pixel of the signal light beam L in the image P.

In some cases, the sum is not significantly different from zero or the absolute value of the sum is not larger than zero even after the timing of image-capturing by the imaging unit 5 has been shifted forward or backward in time. In such a case, it may be determined that the signal light beam L is not included in the incident light R. That is, it may be determined that the transmission source T is not existent within the receptable range of the receiver 1. Once the position or pixel of the signal light beam L in the image P is specified as described above, it may no longer be necessary to intermittently transmit the subsequent signal light beam L as illustrated in the top of FIG. 3. Instead, the signal light beam L may be continuously transmitted from the transmission source T without the time intervals τ. After the position or pixel of the signal light beam L in the image P is specified, the specifying unit 6 may track the signal light beam L in each subsequent image P captured by the imaging unit 5 on the basis of the specified position to specify the position or pixel of the signal light L in the images P.

As illustrated in FIG. 1, the second light beam R2 split by the beam splitter 3 may travel straight through the half mirror or the beam splitter 3 and enter a lens system 7. Note that the lens system 7, the lens system 4, and a lens system 9 described below may each include a single lens or convex and concave lenses in combination, for example.

A blocker 8 may be disposed downstream of the lens system 7. The second light beam R2 entering the lens system 7 may be refracted by the lens system 7 and form an intermediate image on the blocker 8. The lens system 9 and a light-receiving device 10 may be disposed downstream of the blocker 8. The lens system 9 may form an image of a third light beam R3 passing through the blocker 8 on the light-receiving device 10. The light-receiving device 10 may convert a light signal to an electrical signal and output the electrical signal. In this example embodiment, at least the lens system 7 and the blocker 8 may be disposed between the beam splitter 3 and the light-receiving device 10. In one embodiment, the lens system 7 may serve as a "second lens system".

The blocker 8 may be controlled by a controller 11 coupled to the specifying unit 6. In this example embodiment, the controller 11 may include a computer and the like. In another example embodiment, the controller 11 may be integrated with the specifying unit 6. The controller 11 controls the blocker 8 on the basis of the position or pixel of the signal light beam L in the image P specified by the specifying unit 6, to allow only the third light beam R3, which is a limited portion of the second light beam R2 having passed through the beam splitter 3 and including the signal light beam L, to enter the light-receiving device 10, and prevent the remaining portion of the second light beam R2 from entering the light-receiving device 10. The configuration and the like of the blocker 8 will now be described in detail.

Figure 4:
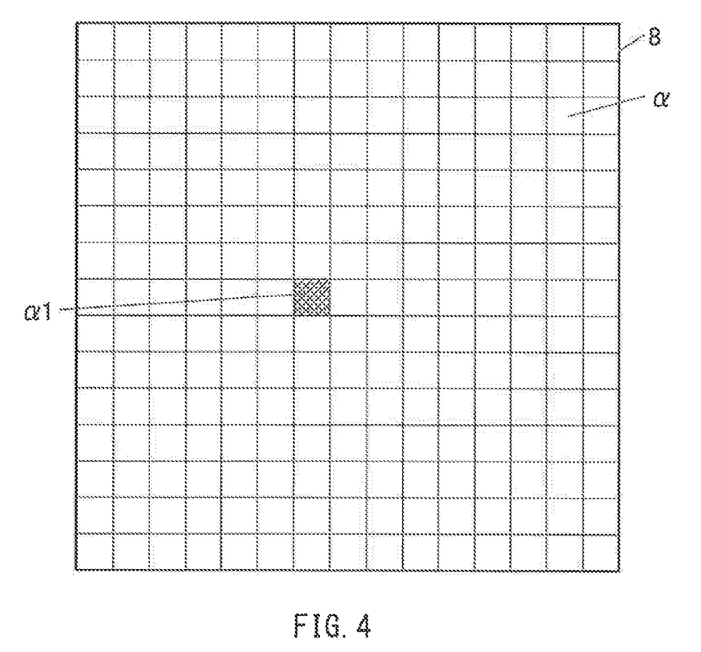
FIG. 4 is a diagram illustrating a configuration example or the like of a blocker.

For example, the blocker 8 may include a liquid crystal panel segmented into multiple small regions α, as illustrated in FIG. 4. Each small region α is switchable between a light transmitting state and a light blocking state. That is, for example, each small region α of the blocker 8 may become translucent to transmit light when a predetermined voltage is applied thereto, and may turn dark to block light when another predetermined voltage is applied thereto. Note that the size of the small region α relative to the overall size of the blocker 8 in FIG. 4 may not reflect the actual size of the blocker 8, and the relative size of the small region α may be appropriately determined.

In this example, the controller 11 may preliminarily store the correlation between each pixel (x,y) of the image P captured by the imaging unit 5 and a corresponding small region α of the blocker 8. For example, the controller 11 may preliminarily store the correlation among each small region α of the blocker 8; a corresponding pixel in the image P captured by the imaging unit 5; and a corresponding portion of the second light beam R2 passing through the beam splitter 3 and the small region α when the small region α of the blocker 8 is switched from the light blocking state to the light transmitting state. After the specifying unit 6 has specified the position or pixel of the signal light beam L in the image P as described above with reference to FIG. 2, the controller 11 may refer to the correlation to determine one of the small region α1 of the blocker (liquid crystal panel) 8 corresponding to the specified position or pixel of the signal light beam L in the image P. The controller 11 may control the blocker 8 to cause the one of the small region α1 to transmit the second light beam R2 and cause the remaining small regions α to block the second light beam R2, as illustrated in FIG. 4. Note that, in FIGS. 4 and 5, the hatched small regions α may transmit light, and the unhatched small regions α may block light.

With such a configuration, the controller 11 may control the blocker 8 on the basis of the position or pixel of the signal light beam L in the image P specified by the specifying unit 6, to allow only the third light beam R3, which is a limited portion of the second light beam R2 having passed through the beam splitter 3 and including the signal light beam L, to enter the light-receiving device 10 and prevent the remaining portion of the second light beam R2, which does not include the signal light beam L or which is the portion of the second light beam R2 other than the third light beam R3 including the signal light beam L, from entering the light-receiving device 10.

Figure 5:
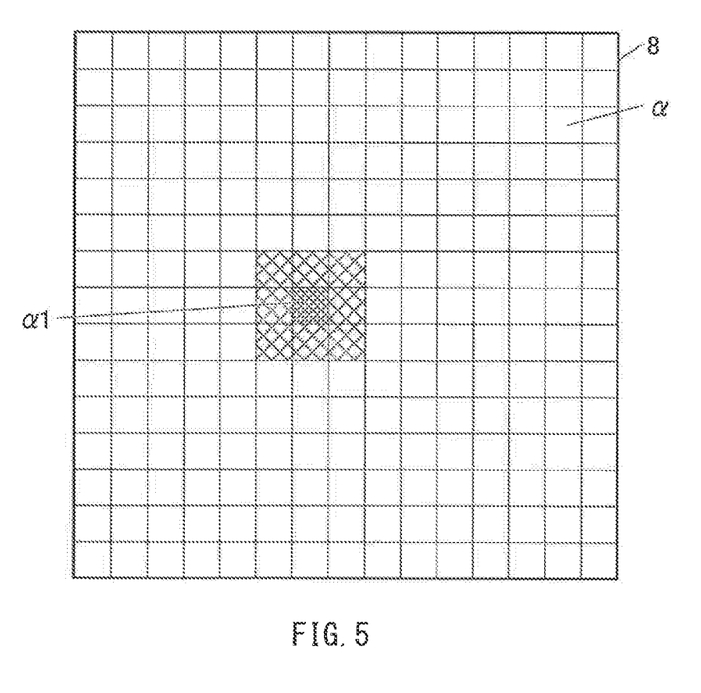
FIG. 5 is a diagram illustrating light passing through not only a small region determined in the configuration example in FIG. 4 but also other small regions surrounding the small region.

To certainly enter the signal light beam L to the light-receiving device 10, not only the specified small region α1 but also the small regions α in the vicinity of the specified small region α1 (e.g., the small region α1 and the small regions α surrounding the specified small region α1) may be switched to the light transmitting state, as illustrated in FIG. 5, for example. Also in such a case, the remaining small regions α may be switched to the light blocking state.

Figure 6A:
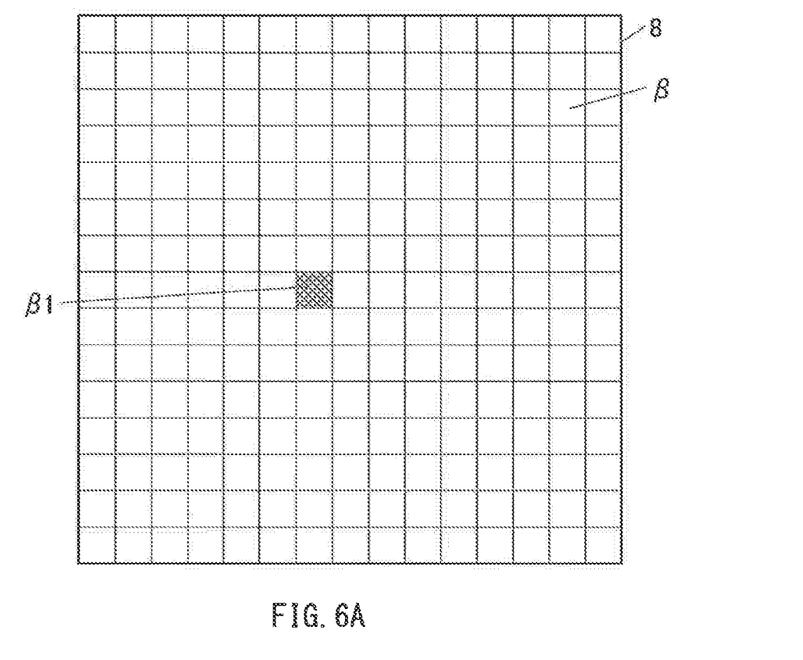
FIG. 6A is a diagram illustrating another configuration example or the like of the blocker.
Figure 6B:
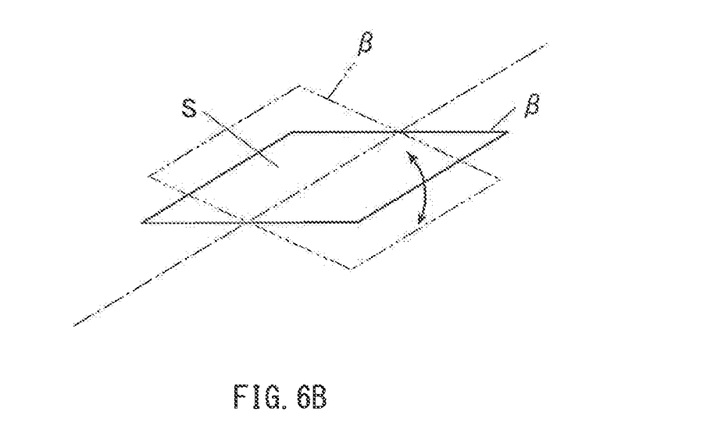
FIG. 6B is a diagram illustrating a mirror element configured to be electromagnetically tilted.

In another configuration example of the blocker 8, the blocker 8 may include a mirror mechanism including multiple mirror elements β arranged in a matrix, as illustrated in FIG. 6A. In this example, the reflective surface s of each mirror element β may be electromagnetically tilted, as illustrated in FIG. 6B. Note that, in the example illustrated in FIG. 6B, the tilt angle of the reflective surface s may be varied by turning the mirror element β around a turning axis. However, the method of varying the tilt angle of the reflective surface s of the mirror element β may not be limited to such a method.

In this example, the controller 11 may preliminarily store the correlation between each pixel (x,y) of the image P captured by the imaging unit 5 and a corresponding mirror element β of the blocker 8. For example, the controller 11 may preliminarily store the correlation among each mirror element β of the blocker 8; a corresponding pixel in the image P captured by the imaging unit 5; and a corresponding portion of the second light beam R2 passing through the beam splitter 3 and reflected from the mirror element β toward the light-receiving device 10 when the tilt angle of the reflective surface s is varied. After the specifying unit 6 has specified the position or pixel of the signal light beam L in the image P as described above with reference to FIG. 2, the controller 11 may refer to the correlation to determine a mirror element β1 of the blocker (mirror mechanism) 8 corresponding to the specified position or pixel of the signal light beam L in the image P. The controller 11 may control the tilt angle of the reflective surface s of each mirror element β of the blocker (mirror mechanism) 8 to cause the determined mirror element β1 illustrated in FIG. 6A to reflect the second light beam R2 in a direction in which a reflected light beam or the third light beam R3 is allowed to enter the light-receiving device 10 through the lens system 9, and cause the remaining mirror elements β to reflect the second light beam R2 in a direction in which a reflected light beam is prevented from entering the light-receiving device 10. Note that, in FIG. 6A, the hatched mirror element β may reflect light toward the light-receiving device 10, and the unhatched mirror elements β may prevent the light from entering the light-receiving device 10.

With such a configuration, the controller 11 may control the blocker 8 on the basis of the position or pixel of the signal light beam L in the image P specified by the specifying unit 6 to allow only the third light beam R3, which is the limited portion of the second light beam R2 having passed through the beam splitter 3 and including the signal light beam L, to enter the light-receiving device 10 and prevent the remaining portion of the second light beam R2, which does not include the signal light beam L or which is the portion of the second light beam R2 other than the third light beam R3 including the signal light beam L, from entering the light-receiving device 10.

Although not illustrated, to certainly enter the signal light beam L to the light-receiving device 10, not only the specified mirror element β1 but also the mirror elements β in the vicinity of the specified mirror element β1 (e.g., the mirror element β1 and the mirror elements β surrounding the specified mirror element β1) may be caused to reflect light in which the reflected light is allowed to enter the light-receiving device 10. Also in such a case, the remaining mirror elements β may be caused to reflect light in a direction in which the reflected light is prevented from entering the light-receiving device 10.

Example Effects

According to at least one example embodiment described above, it is possible to provide a compact receiver 1 for free-space optical communication that receives a signal light beam L certainly separated from the background light. For example, the blocker 8 of the receiver 1 for free-space optical communication according to an example embodiment allows only the third light beam R3, which is the limited portion of the light R incident on the receiver 1 including the signal light beam L, to enter the light-receiving device 10 and prevents the remaining portion of the light R from entering the light-receiving device 10, rather than allowing light R incident on the receiver 1 to enter the light-receiving device 10 from any incident direction on the receiver 1. Therefore, it is possible to receive the signal light beam L certainly separated from the background light (i.e., other light than the signal light beam L).

In the receiver 1 for free-space optical communication according to at least one example embodiment described above, only the third light beam R3, which is the limited light portion including the signal light beam L, may enter the light-receiving device 10. Thus, only a certain amount of light may enter the light-receiving device 10. Therefore, the signals may be prevented from being saturated even when the light-receiving device 10 has a small dynamic range. This eliminates the need for a light-receiving device having a large dynamic range. Since only the third light beam R3, which is a limited light portion including the signal light beam L, enters the light-receiving device 10, the receiver 1 may receive the signal with a high S/N ratio.

In the receiver 1 for free-space optical communication according to at least one example embodiment described above, the position or direction of the transmission source T of the signal light beam L may be specified on the basis of the position or pixel of the signal light beam L in the image P of the first light beam R1 split by the beam splitter 3. Therefore, there is no need to cause the view axis of the receiver 1 to be continuously aimed at the transmission source T. For this reason, the receiver 1 may not need to include a view-axis stabilizing mechanism, such as a gimbal. Therefore, according to the at least one example embodiment described above, it is possible to provide a compact receiver 1 for free-space optical communication.

Note that example embodiments of the technology are not limited to the above-described example embodiments, and that the example embodiments of the technology may be appropriately modified without departing from the scope of the technology. For example, multiple receivers 1 for free-space optical communication may be mounted on an aircraft or the like such that the receivers 1 are oriented in multiple directions. In this way, at least one of the receivers 1 is able to receive a signal light beam L from the transmission source T regardless of the position of the transmission source T relative to the aircraft. As a result, it is possible to certainly receive the signal light beam L.

Comparative Examples

A typical receiver for free-space optical communication focuses only a signal light beam on a light-receiving device by narrowing the angle of view using a telephoto lens system while preventing other light than the signal light beam from entering the light-receiving device as much as possible. To achieve this, the view axis of such a receiver has to be constantly aimed at the transmission source or transmitter of the signal light beam. This requires the receiver to include a high-performance view-angle stabilizing mechanism, such as a gimbal.

Such a configuration can lead to a significant increase in the cost of the receiver and an increase in the size of the receiver. Therefore, in some cases, it has been difficult to mount multiple receivers on an aircraft or the like. In order to cope with this, recently, various compact receivers for free-space optical communication have been proposed that require no view-angle stabilizing mechanism, such as a gimbal. For example, JP-A Nos. H05-003454 and 2006-148192 disclose receivers including light-shielding plates or liquid crystal shutters for partially blocking light entering light-receiving devices. Such alight-shielding plate or liquid crystal shutter is disposed upstream of the light-receiving device at a position where the S/N ratio of the signal light beam is high.

Additionally, JP-A No. H11-215062 discloses a technology for extracting only a signal light beam. In this technology, a signal light beam in an infrared wavelength band is emitted from a transmitter to a receiver. The receiver polarizes only a portion of the incident light in the infrared wavelength band and transmits the polarized light through a liquid crystal plate having a polarization direction that turns by 90 degrees in response to voltage application. The signal light beam is extracted by determining the difference between the image of the signal light beam and the background light (i.e., light other than the signal light beam) captured during no voltage application to the liquid crystal plate and the image of the background light captured during voltage application to the liquid crystal plate. In another method of extracting a signal light beam, a signal light beam is extracted by applying a bandpass filter to a signal outputted from a light-receiving device that has received the light including the signal light from the receiver.

However, the technologies disclosed in JP-A Nos. H05-003454, 2006-148192, and H11-215062, and the method using a bandpass filter all require a light-receiving device to receive the light including the signal light beam (i.e., the signal light beam and the background light). If the dynamic range of the light-receiving device is small, the signal is saturated, hindering the separation of the signal light beam from the background light. Furthermore, the use of a light-receiving device having a large dynamic range can lead to low resolution, causing difficulty in the separation of the signal light beam from the background light.

Therefore, it is desirable to provide a compact receiver for free-space optical communication that receives a signal light beam certainly separated from the background light. According to at least one example embodiment of the technology, it is possible to provide a compact receiver for free-space optical communication that receives a signal light beam certainly separated from the background light.

One or more of the specifying unit 6 and the controller 11 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the specifying unit 6 and the controller 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the specifying unit 6 and the controller 11 illustrated in FIG. 1.

The invention claimed is:

1. A receiver for free-space optical communication, the receiver comprising:
   a beam splitter configured to split incident light into a first light beam and a second light beam, the first light beam and the second light beam traveling in different directions;
   an imaging unit configured to capture an image of the first light beam;
   a specifying unit configured to extract a signal light beam from the image of the first light beam captured by the imaging unit and specify a position of the signal light beam in the image;
   a light-receiving device configured to receive the second light beam; and
   a controller configured to control a blocker disposed between the beam splitter and the light-receiving device on a basis of the position of the signal light beam specified by the specifying unit to
      allow only a limited portion of the second light beam to enter the light-receiving device, the limited portion of the second light beam including the signal light beam, and
      prevent a remaining portion of the second light beam from entering the light-receiving device.

2. The receiver for free-space optical communication according to claim 1, wherein,
   the blocker includes a liquid crystal panel segmented into a plurality of small regions, the small regions each being configured to switch between a light transmitting state transmitting the second light beam and a light blocking state blocking the second light beam, and
   the controller is configured to control the blocker to
      cause one of the small regions of the liquid crystal panel corresponding to the position of the signal light beam specified by the specifying unit or the one of the small regions and some of the small regions surrounding the one of the small regions to transmit the second light beam, and
      cause remaining ones of the small regions to block the second light beam.

3. The receiver for free-space optical communication according to claim 2, further comprising
   a first lens system configured to
      refract the signal light beam entering from any direction to a predetermined direction, and
      cause the refracted signal light beam to enter the beam splitter.

4. The receiver for free-space optical communication according to claim 3, further comprising
   a second lens system disposed between the beam splitter and the light-receiving device, the second lens system being configured to form an intermediate image of the second light beam on the blocker.

5. The receiver for free-space optical communication according to claim 2, further comprising
   a second lens system disposed between the beam splitter and the light-receiving device, the second lens system being configured to form an intermediate image of the second light beam on the blocker.

6. The receiver for free-space optical communication according to claim 1, further comprising
   a first lens system configured to
      refract the signal light beam entering from any direction to a predetermined direction, and
      cause the refracted signal light beam to enter the beam splitter.

7. The receiver for free-space optical communication according to claim 6, further comprising
   a second lens system disposed between the beam splitter and the light-receiving device, the second lens system being configured to form an intermediate image of the second light beam on the blocker.

8. The receiver for free-space optical communication according to claim 1, further comprising
   a second lens system disposed between the beam splitter and the light-receiving device, the second lens system being configured to form an intermediate image of the second light beam on the blocker.

9. The receiver for free-space optical communication according to claim 1, wherein,
   the blocker includes a mirror mechanism including a plurality of mirror elements arranged in a matrix, the mirror elements each having a reflective surface configured to be electromagnetically tilted.

10. A receiver for free-space optical communication, the receiver comprising:
    a beam splitter configured to split incident light into a first light beam and a second light beam, the first light beam and the second light beam traveling in different directions;
    an imaging unit configured to capture an image of the first light beam;

a specifying unit configured to extract a signal light beam from the image of the first light beam captured by the imaging unit and specify a position of the signal light beam in the image;

a light-receiving device configured to receive the second light beam; and a controller configured to control a blocker disposed between the beam splitter and the light-receiving device on a basis of the position of the signal light beam specified by the specifying unit to allow only a limited portion of the second light beam to enter the light-receiving device, the limited portion of the second light beam including the signal light beam, and prevent a remaining portion of the second light beam from entering the light-receiving device, wherein, the blocker includes a mirror mechanism including a plurality of mirror elements arranged in a matrix, the mirror elements each having a reflective surface configured to be electromagnetically tilted, and the controller is configured to control a tilt angle of the reflective surface of each of the mirror elements of the mirror mechanism to cause one of the mirror elements of the mirror mechanism corresponding to the position of the signal light beam specified by the specifying unit or the one of the mirror elements and some of the mirror elements surrounding the one of the mirror elements to reflect the second light beam in a direction in which a reflected light beam is allowed to enter the light-receiving device, and cause remaining ones of the mirror elements to reflect the second light beam in a direction in which a reflected light beam is prevented from entering the light-receiving device.

11. The receiver for free-space optical communication according to claim 10, further comprising a first lens system configured to refract the signal light beam entering from any direction to a predetermined direction, and cause the refracted signal light beam to enter the beam splitter.

12. The receiver for free-space optical communication according to claim 11, further comprising a second lens system disposed between the beam splitter and the light-receiving device, the second lens system being configured to form an intermediate image of the second light beam on the blocker.

13. The receiver for free-space optical communication according to claim 10, further comprising a second lens system disposed between the beam splitter and the light-receiving device, the second lens system being configured to form an intermediate image of the second light beam on the blocker.

14. A receiver for free-space optical communication, the receiver comprising:

a beam splitter configured to split incident light into a first light beam and a second light beam, the first light beam and the second light beam traveling in different directions;

an imaging unit configured to capture an image of the first light beam;

a light-receiving device configured to receive the second light beam; and circuitry configured to extract a signal light beam from the image of the first light beam captured by the imaging unit, specify a position of the signal light beam in the image, and control a blocker disposed between the beam splitter and the light-receiving device on a basis of the specified position of the signal light beam to allow only a limited portion of the second light beam to enter the light-receiving device, the limited portion of the second light beam including the signal light beam and prevent a remaining portion of the second light beam from entering the light-receiving device.

15. The receiver for free-space optical communication according to claim 14, wherein, the blocker includes a mirror mechanism including a plurality of mirror elements arranged in a matrix, the mirror elements each having a reflective surface configured to be electromagnetically tilted.

16. The receiver for free-space optical communication according to claim 14, wherein, the blocker includes a mirror mechanism including a plurality of mirror elements arranged in a matrix, the mirror elements each having a reflective surface configured to be electromagnetically tilted, and the circuitry is configured to control a tilt angle of the reflective surface of each of the mirror elements of the mirror mechanism to cause one of the mirror elements of the mirror mechanism corresponding to the position of the signal light beam specified by the specifying unit or the one of the mirror elements and some of the mirror elements surrounding the one of the mirror elements to reflect the second light beam in a direction in which a reflected light beam is allowed to enter the light-receiving device, and cause remaining ones of the mirror elements to reflect the second light beam in a direction in which a reflected light beam is prevented from entering the light-receiving device.

* * * * *